US010918239B2

(12) United States Patent
Hartmann et al.

(10) Patent No.: US 10,918,239 B2
(45) Date of Patent: Feb. 16, 2021

(54) DRINKS PREPARATION MACHINE (71) Applicant: Qbo Coffee GmbH, Wallisellen (CH)

(72) Inventors: Doreen Hartmann, Zürich (CH); Nils Eckelt, Hamburg (DE); Wolfgang Gödde, Neuenrade (DE)

(73) Assignee: QBO COFFEE GMBH, Wallisellen (CH)

( * ) Notice: Subject to any disclaimer, the term of this patent is extended or adjusted under 35 U.S.C. 154(b) by 268 days.

(21) Appl. No.: 16/076,762

(22) PCT Filed: Feb. 10, 2017

(86) PCT No.: PCT/EP2017/053018
§ 371 (c)(1),
(2) Date: Aug. 9, 2018

(87) PCT Pub. No.: WO2017/137568
PCT Pub. Date: Aug. 17, 2017

(65) Prior Publication Data
US 2019/0045971 A1 Feb. 14, 2019

(30) Foreign Application Priority Data
Feb. 12, 2016 (EP) .................... 16155563

(51) Int. Cl.
A47J 31/40 (2006.01)
A47J 31/52 (2006.01)
(Continued)

(52) U.S. Cl.
CPC ............. *A47J 31/52* (2013.01); *A47J 31/002* (2013.01); *A47J 31/402* (2013.01); *A47J 31/404* (2013.01);
(Continued)

(58) Field of Classification Search
CPC ........ A47J 31/002; A47J 31/40; A47J 31/402; A47J 31/41; A47J 31/4496; G01F 13/06; G01F 9/02
(Continued)

(56) References Cited

U.S. PATENT DOCUMENTS 5,207,148 A * 5/1993 Anderson ............... A47J 31/52
99/281
5,650,186 A 7/1997 Annoni et al.
(Continued)

FOREIGN PATENT DOCUMENTS

DE 102013200686 A1 * 7/2014 .......... B67D 1/0041
EP 1 992 263 12/2011
(Continued)

OTHER PUBLICATIONS

European Office Action dated Dec. 12, 2019, Application No. 17 703 449.3, 5 pages.
(Continued)

Primary Examiner — Reginald Alexander
(74) Attorney, Agent, or Firm — Rankin, Hill & Clark LLP (57) ABSTRACT A drinks preparation system includes a preparation module for a brewed drink, a milk module for the delivery of milk and at least one outlet that is designed such that the brewed drink and the milk can be delivered into one and the same drinks vessel, which is placed on a placement platform, i.e. without having to rearrange the drinks vessel between the delivery of the brewed drink and the delivery of the milk. The system further includes a display device with a graphic display for the display of the delivery drinks quantity in real time. The display device is configured to display the cumulative quantity of the delivered brewed drink and of the delivered milk via a common, graphic display element. The
(Continued)

display element therefore shows a filling level, which represents an added quantity of the two drinks shares (brewed drink, delivered milk).

12 Claims, 4 Drawing Sheets

(51) Int. Cl.
  *A47J 31/00* (2006.01)
  *A47J 31/44* (2006.01)
  *G07F 9/02* (2006.01)
  *A47J 31/41* (2006.01)

(52) U.S. Cl.
  CPC ............ *A47J 31/4485* (2013.01); *A47J 31/41* (2013.01); *G07F 9/02* (2013.01)

(58) Field of Classification Search
  USPC ...................... 99/285, 293, 323.1; 222/29, 27
  See application file for complete search history.

(56) References Cited

U.S. PATENT DOCUMENTS

2012/0258216 A1* 10/2012 Wessels .................... G07F 9/02
  426/231

2012/0297989 A1* 11/2012 Tonelli ................ A47J 31/4485
  99/293

FOREIGN PATENT DOCUMENTS

| | | | | |
|---|---|---|---|---|
| EP | 2 441 361 | 4/2012 | | |
| EP | 2 449 929 | 5/2012 | | |
| EP | 2 878 241 | 6/2015 | | |
| EP | 3 168 815 | 5/2017 | | |
| WO | 2007/003062 | 1/2007 | | |
| WO | 2010/010587 | 1/2010 | | |
| WO | WO-2016026586 A1 * | 2/2016 | ............. | G07F 9/023 |
| WO | 2016/046239 | 3/2016 | | |
| WO | WO-2018211954 A1 * | 11/2018 | ........... | G01F 23/292 |

OTHER PUBLICATIONS

YouTube web page of MediaMarkt Nederland: "Media Markt—Siemens EQ.9 S700 tutorial—Product video", https://www.youtube.com/watch?v=eL3ehlbel-w; English translation of abstract included, 3 pages.

English translation of International Preliminary Report on Patentability dated Aug. 14, 2018 (Aug. 14, 2018), Application No. PCT/EP2017/053018, 5 pages.

* cited by examiner

DRINKS PREPARATION MACHINE

BACKGROUND OF THE INVENTION

Field of the Invention

The invention relates to drinks preparation machines for preparing drinks or the like from a portion package with a portion packaging (for example capsule) and with an extraction material (for example coffee) which is contained in the portion packaging. In particular, it relates to a drinks preparation system with a preparation module for a brewed drink and with a milk module for the delivery of milk.

Description of Related Art

Drinks preparation machines for preparing drinks or the like from an extraction material that is present in a portion package are known, for example, as coffee machines or espresso machines. In many corresponding systems, the portion packaging is designed as capsules, in which the extraction material is sealed, for example in an airtight manner. For extraction, the capsule is pierced, for example, at two sides, which are opposite to one another. An extraction fluid—generally hot water—is then introduced at the first side. The extraction product is discharged from the capsule at the second side. This takes place in a so-called brewing module.

Apart from a brewing module, one or more further units for delivering and adding a further drinks component such as, for example, milk or also syrup can be present.

EP 1 992 263 B1 relates to a drinks preparation machine (coffee machine), with which a graphic or optical output means, which is in data communication with a detecting device (flowmeter), provides real-time information on the drinks quantity that is delivered by the pump. WO 2007/003062 A1 also teaches the same for a different coffee machine.

A drinks preparation system with a drinks preparation machine as a base unit and with an appliance that can be docked thereon for preparing frothed milk is known, for example, from the international patent application PCT/EP2015/071795. The appliance has a docking element with a milk froth outlet, wherein the system is designed such that the milk froth outlet and the drinks outlet of the base unit in the docked condition are arranged directly next to one another above a placement platform for a drinks vessel. Systems of this type permit the preparation of a mixed drink from milk and, for example, coffee. Whereas, from a technical point of view, such a preparation strictly speaking corresponds to the successive or at least partially simultaneous preparation of two drinks, it is perceived by the user as the preparation of a single drink.

SUMMARY OF THE INVENTION

It is an object of the invention to provide a drinks preparation system which is simple and intuitive in operation and provides the user with a good overview on the state of the method during the preparation process.

The drinks preparation system includes a preparation module for a brewed drink, a milk module for the delivery of milk and at least one outlet that is designed such that the brewed drink and the milk can be delivered into one and the same drinks vessel, the drinks vessel being placed on a placement platform (i.e. without having to rearrange the drinks vessel between the delivery of the hot drink and the delivery of the milk). It further includes a display device with a graphic display for the display of the delivered drinks quantity in real time. The display device is configured to display a cumulative quantity of the delivered brewed drink and of the delivered milk via a common display element. The display element thus indicates a filling level that represents an added quantity, in particular an added volume, of the two drinks shares (brewed drink, delivered milk).

The fact that the drinks preparation machine or a system with a drinks preparation machine is "configured" or "designed" to carry out the steps means that there would not only be the possibility of carrying out the respective steps, but specific measures (hardware, programming) are applied in the machine, in order to carry out these steps given designated operation.

The display element is designed such that during the preparation process it provides the user with an intuitively understandable representation of the progress on preparation, i.e. a graphic representation that renders it intuitively recognisable as to how far the preparation of the desired drink has progressed. Herein, the representation permits the recognition of this progress for the mixed drink (from the brewed product and the milk) as a whole, i.e. a quantity that forms the sum of the quantities of the part-drinks is graphically represented.

The fact that the display element displays the added quantity of the two drinks shares means that the filling level displays for the two drinks shares are represented in an added manner in a common representation, i.e. the user does not need to intellectually or numerically add the quantities, in order to obtain a measure for the complete filling quantity. Herein, it is possible but not necessary for the part-quantities to be likewise recognisable as such.

For example, the display element can be designed as a progress bar. Here, a progress bar is any so-called bar-graph display, with which the quantity to be represented is represented by the extension of a graphic element in one direction (the "length" of the "bar")—even if the shape differs from a pure bar shape, for example by way of the bar appearing as a drinks vessel, with a constant diameter or also one that is not constant along the progress direction.

Other diagram shapes are also conceivable as an alternative to the progress bar, for example a circular shape with a sector that displays the progress and becomes continuously larger, etc.

In both cases, the colour of the extending element that displays the filling level can be constant over the complete area and the complete preparation procedure—which of course would particularly be the case given a monochromatic display—or can have a purely decorative colour course, or however the colour for the two drinks shares can differ, for example by way of the milk share being represented in a lighter colour than the brewed drink share, under certain circumstances while taking the milk froth into account separately.

In particular, the brewed drink that is prepared by the preparation module is coffee, possibly also another hot drink that can be mixed with milk. The preparation module is accordingly in particular a coffee machine or a part of a coffee machine. In particular, it can be designed as a drinks preparation module with a brewing module for receiving a portion package of the aforementioned type, in particular a portion capsule that is filled with an extraction material (for example coffee powder).

Generally, apart from the brewing module, for example for receiving the portion package, the preparation module also includes further elements as are known per se for drinks preparation machines, for example a water tank, a liquid pump and a water heating means, which are arranged successively in the flow direction and upstream of the brewing module, in order to supply the brewing module with hot water that then, particularly in a portion package of the mentioned type, is brought into contact with the extraction material or possibly with the extract.

The preparation module and the milk module can be integrated together in a common unit. Alternatively, the preparation module and the milk module can also be present in separate devices that can be coupled onto one another. In particular, as is described in PCT/EP2015/071795, they can include a base unit with the preparation module, and, dockable onto this, the milk module as an appliance that is dockable via a docking element and is activated and supplied with electricity and steam from the base unit. In this case, in which the milk module cannot function as an autonomous machine, the base unit and the milk module together can form a drinks preparation machine. However, one also does not rule out the milk module being formed by a device with its own electricity supply and activation/control, wherein a superordinate control of the base unit and of the milk module can then be present in the base unit, in the milk module or in a separate unit (for example, an operating appliance as described hereinafter).

In all these cases, a drinks preparation system can consist of the drinks preparation machine. Alternatively, it can further optionally include further components additionally to the drinks preparation machine. For example, the drinks preparation system can include an operating appliance, e.g. a mobile telephone, in particular smartphone, with a suitable user interface and corresponding software enabling the device to be an operating appliance.

In particular, the display device with the display element can be present at the drinks preparation machine and be arranged there, for example on the base unit. However, a display device, which is separate from the drinks preparation machine, for example on a separate element that is in communication connection with the drinks preparation machine, for example on an operating appliance of the mentioned type, is not to be ruled out.

The outlet (run-out) means for delivering the brewed drink and the milk can be formed by a common outlet, into which conduits for the two drinks constituents (components) run out. Alternatively, it can also be formed by two outlets, a brewed drink outlet and a milk outlet for the milk and possibly for the milk froth. In the latter case, the two outlets are arranged in particular close enough to one another, for example maximally 5 cm, in particular maximally 4 cm or maximally 3 cm. Optionally, the outlets can be formed on the one hand by the drinks preparation machine and on the other hand by the milk module, as is described in PCT/EP2015/071795, wherein they are then both arranged for example close to an end surface that includes the interface for steam and under certain circumstances also an electrical interface.

The milk, which is delivered from the milk module, can be delivered in the form of liquid warm or cold milk and/or as warm or cold milk froth. Accordingly, the milk module can include a milk delivery and/or milk frothing appliance, for example for the selective delivery of milk and/or for heating milk and/or for the preparation of cold or hot milk froth. The milk module can additionally include a milk vessel.

The drinks preparation system, generally as part of the drinks preparation machine, includes a control unit that controls the preparation of the brewed drink and the delivery and/or preparation of the milk. The control unit is configured, on the basis of a preparation prescript, to control the quantities/quantity ratios of the delivered brewed drink and the delivered milk—in unfrothed form and possibly in frothed form. The sequence of the preparations can be set and thus adapted in the preparation prescript. Such a preparation prescript—also called "recipe"—can be made available to the control unit in one or more of the following manners:

It can be stored in memory means of the drinks preparation machine, the memory means belonging to the control unit or to which the control unit can gain access, and be selectable for example from a plurality of such stored preparation prescripts.

It can be defined directly by the user on the basis of an input via the user interface of the drinks preparation machine, for example by way of adapting the quantity shares of the drinks constituents via a graphic display element (touchscreen or the like) of the user interface.

It can be transferred (transmitted) to the control by way of an external operating appliance of the drinks preparation system. Such an operating appliance—for example a mobile telephone, which is equipped with corresponding software—then serves quasi as an external user interface.

Combinations are also possible, and a preparation prescript which has already been transferred at an earlier stage can be stored in the memory means, for example.

In all cases, supplementarily or alternatively to the selection by the user, a (pre)selection on the basis of the results of a capsule recognition can be provided, for example by way of a portion package which is provided with a corresponding coding being recognised by the drinks preparation machine and the selection of preparation prescripts, suggested (standard) preparation prescripts and/or limits for settable values being dependent on characteristics of the recognised capsule.

A preparation prescript includes, for example, information on the quantity of the brewed drink, and optionally on the sequence (first milk/first brewed drink) and the milk temperature (cold/hot/intermediate stages are also conceivable).

Furthermore, it generally includes information on the milk quantity and, for example, also the milk froth quantity inasmuch as this can be adjusted. This can be stored or transferred for example in two different formats:

a) X ml milk/Y ml milk froth
b) Z ml total volume with share of milk=x % and share of milk froth=y %.

Herein, x %=X/Z*100% and y %=Y/Z*100%—and one can therefore convert depending on which format has be transferred and which format is used in the machine.

Since a share of unfrothed milk is often inevitably also produced on creating milk froth (for example approx. 30% of the total volume depending on the appliance), X and Y are not independent of one another. The volumes each relate to the volume in the drinks vessel, thus in the case of the milk froth also include the entrained air.

In embodiments, the volume of the milk froth as such is taken into account on displaying the cumulative quantity, i.e. the displayed drinks quantity is not a pure liquid volume, but within the accuracy that is suitable for such a display is the volume of the delivered drink including milk froth, to which the entrained air also belongs.

Apart from volumes or volume shares of the drinks constituents, the preparation prescript can also include other information, in particular:

the sequence of the preparation steps;

temperature-relevant information (for example desired temperature of the water heating means or of the water);

details for feeding steam during the delivery of milk etc.;

instructions for rinsing and cleaning procedures that are to be carried out, for example a temperature-dependent pre-rinsing of the brewing chamber according to the European patent application 15 176 167.3, a post-rinsing, etc. and/or instructions in regard to this, to the user;

details on requests to the user to carry out certain steps for example "now add syrup"; etc., the requests to be represented via the user interface;

arbitrary combinations of this information.

In a group of embodiments, the two quantities for the brewed drink and the milk (possibly optionally taking into account the milk froth) are determined in different manners, i.e. the means for determining the quantities are qualitatively different. Thus, for example, a flowmeter can measure the water quantity that is delivered by the pump during the brewing process for the preparation of the brewed drink and this measurement then corresponds to the measurement of the quantity of the brewed drink. For example, the time that is to be taken for the delivery and/or preparation process can be taken into account for the measurement of the quantity of milk—possibly also amid the separate consideration of the milk froth.

In the latter case, for example, an empirically determined or possibly computed relationship is stored in the system and, for example, in particular in its drinks preparation machine (in the control means or at least in a memory that can be accessed by these, in the drinks preparation machine or for example in an external operating appliance), the relationship permitting an operating duration of the milk element with certain operating parameters to be derived from the desired quantity of milk and the desired quantity of milk froth. Such a relation can take into account the fact that apart from the quantity milk/milk froth, other parameters can also have an influence on the preparation time (operating duration), for example the situation as to whether an air valve for feeding air to the milk frother is opened or closed (or partly opened), an operating parameter of an applied pump (water pump, milk pump), etc.

Example:

If X represents the volume of milk and Y the volume of the milk froth, then in the simplest case the quantities and the times can be linked via linear factors, e.g. $f_1 * t_1 = X$, $f_2 * t_2 = Y$, wherein $t_1$ represents the time duration of the milk delivery with closed air valves and $t_2$ the time duration of the milk delivery with opened air valves. The time requirement for a desired quantity X/Y results directly by way of solving these equations for $t_1$ and $t_2$.

The empirical relationship can also take into account the fact that a share of liquid/non-frothed milk is always delivered on producing milk froth (i.e. one then assumes that the milk is never completely frothed). The volume X of the milk and the volume Y of the milk froth results from this: $X = f_1 * f_3 + f_3 * f_2$, $Y = f_2 * t_2$, wherein again $t_1$ represents the time duration of the milk delivery with closed air valves and $t_2$ the time duration of the milk delivery with opened air valves. $t_1 = (f_2 * X - f_3 * Y)/(f_1 * f_2)$ and $t_2 = Y/f_2$ result from this. The term $(f_2 * X - f_3 * Y)$ may not be negative, which represents a physical limit for the relative share of milk froth compared to milk (i.e. under the assumption that liquid milk always also occurs on producing milk froth, there is logically an upper limit for the relative milk froth share). This physical limit can be taken into consideration on selecting and with the adjustability/setting ability of the preparation prescripts.

The relationship can indeed also be more complex, for example amongst other things if an air valve can be operated with an adaptable cross section and/or several air valves are activatable independently of one another and/or when one is to take into account the fact that the milk temperature has an influence on the frothing behaviour, etc. Whether such effects are taken into account or not depends on the desired accuracy of the display and the filling quantities.

Such more complex relationships can be stored, for example, in the form of more complex formulae, or as tables, from which one then interpolates.

In embodiments, the stored relationship is used for the activation as well as for the display element; for example, a total time $t_1 + t_2$ for the milk preparation is computed for the display element.

The milk quantity can also be measured via a flowmeter or another suitable means instead of considering the preparation time or supplementarily to this.

Conversely, it is also possible for the preparation time to be taken into account for the brewed drink quantity—instead of a measured flow or supplementarily to this, while talking into account a suitable algorithm.

According to a first option, the shares of the brewed drink and of the milk can be taken into account in equal parts in the display element. If the display element, for example, is a progress bar, then according to this option the progress on preparing/delivering the first prepared drinks share (brewed drink or delivered milk) can firstly be displayed by a gradual filling, for example of the left or lower half of the display element, and subsequently the progress on preparing/delivering the second drinks share by the other half. Other fixedly defined shares (for example 60/40 etc.) can also be selected instead of consideration of equal parts.

According to a second option, these relative shares on the display element can be selected according to the volume shares of the specifically prepared drink as are set in the selected preparation prescript.

According to a third option, these relative shares can also be selected on the basis of a previously estimated preparation/delivery time. A relationship between the volume, which is to be prepared, and the brewing time also for the brewed drink can be stored and made available for this purpose, wherein such a relationship can optionally be dependent on the nature of the recognised capsule, inasmuch as a capsule recognition is available.

BRIEF DESCRIPTION OF THE DRAWINGS

The subject-matter of the invention is explained in more detail by way of preferred embodiment examples which is described in the accompanying drawings. In each case in a schematic manner are shown in.

DETAILED DESCRIPTION OF THE INVENTION

The reference numerals that are used in the drawings and their significance are listed in a grouped manner in the list of reference numerals. Basically, the same reference numerals indicate the same or analogous elements in the drawings.

Figure 1:
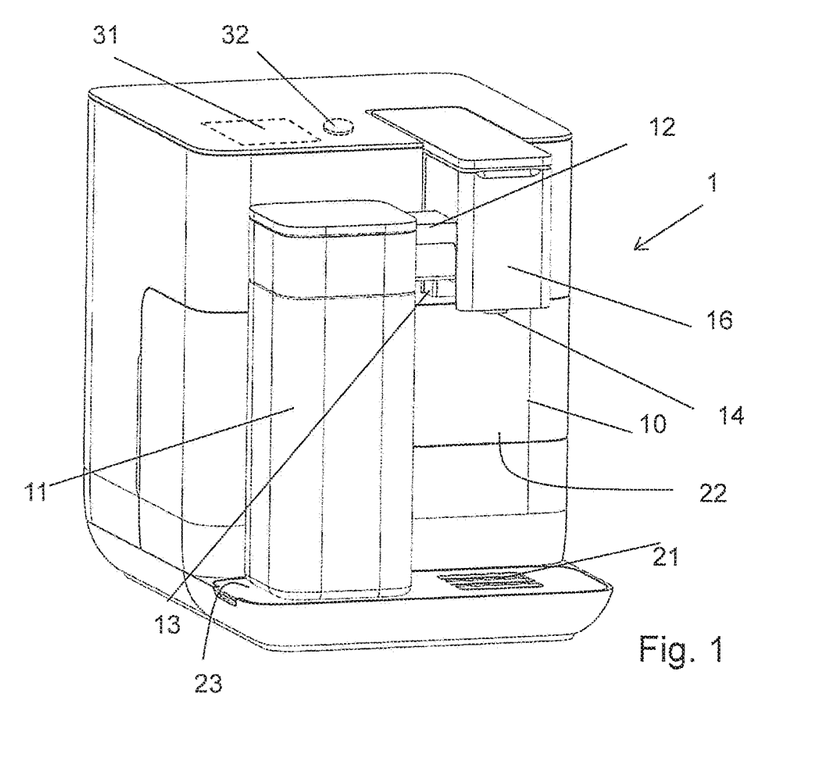
FIG. 1 shows a drinks preparation machine with a preparation module, a milk module and a common activation.

FIG. 1 shows a view of a drinks preparation machine 1 with a base unit 10, which here is designed as a capsule coffee machine, and comprises the preparation module and with a milk frother appliance 11, which can be coupled onto the base unit and serves as a milk module. A docking element 12 of the type described in PCT/EP2015/071795 taps respective interfaces of the base unit or appliance, leads water, steam and possibly air from the base unit into the milk frother appliance and also forms an electrical connection for the supply of voltage and/or for transmitting activation signals from active elements (in particular of a pump) of the milk frother appliance. Furthermore, the docking element forms a milk outlet 13, which in the docked condition lies next to the brewed drink outlet (here coffee outlet 14) of the base unit 10.

The base unit, as is known per se for coffee machines, includes a water container, a water pump and a water heater. A brewing chamber for preparing coffee from heated water by way of extraction from coffee power is moreover present, the coffer powder being provided here in a portion capsule that is previously inserted into the coffee machine before the preparation. As an alternative to the drawn embodiment as a portion capsule system, the coffee machine can also be designed as a so called bean-to-cup coffee machine that also includes a coffee mill and grinds the coffer powder in a portioned manner and feeds it to the brewing chamber. As yet a further alternative, particularly if the coffee machine is designed as a piston machine, i.e. the brewing chamber is formed between a fixed part and a removable piston, one can yet also envisage the coffee power being brought into the brewing chamber by the user in a manner in which it is already in the ground, but loose (non-compacted) condition.

The coffee machine can further include a capture container for spent coffee powder portions (in capsules or in a loose manner, depending on the design of the coffee machine).

A placement platform 21 for placing a drinks vessel is formed on the coffee machine. This can be formed, for example, by way of a grating, below which a capture dish is located. In embodiments, the placement platform can be height-adjustable in a suitable manner.

A coffee outlet 14, through which the brewed coffee runs out and gets into the cup or vessel lying therebelow is located above the placement platform 21. This outlet is located below an outlet hood 16 that forms part of the coffee machine housing and at least partly covers the outlet to the front and to the sides.

The base unit 10 forms a front 22, from which, as is known per se from other coffee machines, on the one hand the placement platform 103 and on the other hand, above this, the outlet hood 16 projects.

Here, a milk frother platform 23, on which the docked milk frother appliance 1 is placed, likewise projects from the front.

A connection location for the connection of the docking element onto the coffee machine is located in the proximity of the coffee outlet 14 and here laterally on the outlet hood 16. This connection location includes a steam delivery location for coupling onto a steam connection of the docking element, and possibly a hot water and/or steam delivery location for coupling onto a feed-through conduit for a cleaning fluid (hot water/steam) for the milk frother appliance. The steam delivery location and the hot water and/or steam delivery location when required are respectively supplied with steam and hot water from the water heater, wherein for example a multi-way valve in the inside of the coffee machine can selectively feed heated liquid or steam to the brewing module, the steam delivery location or the hot water and/or steam delivery location.

Furthermore, a display device 31 and an operating appliance 32 are present and these are arranged on the base unit 10 in the represented embodiment example. Together they form the appliance's own user interface 30 (see FIG. 3).

The display device 31 is a display, without or possibly with a touchscreen functionality.

The operating element 32 is a physical operating element and here is designed as a rotary push button, as is known from many household appliances. The rotary push button can be programmed such that one can select between different elements that are available for selection by way of rotating (different menu points, different preparation prescripts, drinks quantities which differ from one another by way of steps, etc.) and the current selection that is displayed via the display device is confirmed by way of pressing in the axial direction.

Other operating elements, combinations of operating elements or integrated solutions, for example with a touchscreen that forms the display device as well as the operating element, are also conceivable.

In the present embodiment example and generally often preferred, the drinks preparation machine is designed such that it is fully capable of functioning as a standalone appliance and can be operated without the external operating appliance described hereinafter, i.e. all inputs and information outputs, which are actually necessary for operation can be effected via the appliance's own user interface, which does not rule out certain functionalities which are not necessary for operation—for example the adjustment of relative quantities—optionally requiring an input via the operating appliance.

Here too, the base unit (capsule coffee machine) is designed such that it can also be operated without the milk module, wherein preferably the presence or absence of the milk module can be detected and the respective (milk-) functions are only available when the milk module is coupled.

Figure 2:
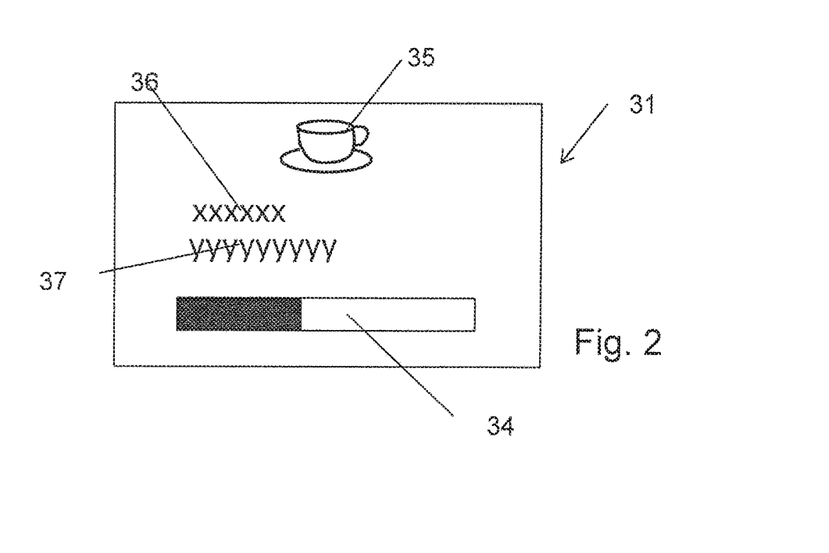
FIG. 2 shows a display device.

The display device 31 can be seen in FIG. 2. It includes a display element 34. This here is designed as a progress bar (bar-graph display).

In the represented embodiment example, the display element is designed as a plain bar. However, it is also possible to provide such a progress bar with graphic elements, for example by way of colour selection, suitably designed shapes, moving elements etc.; and a representation of the progress bar, for example in the form of a drinks vessel, is not ruled out.

Apart from the display element 34, further information, for example a symbol 35 that indicates the type of the procedure (brewing the drink, cleaning procedure, etc.) is displayed on the display device 31. A matching symbol can be displayed for each phase of the drinks preparation (brewing procedure, milk preparation, etc.). However, it is of course also conceivable to display the same symbol during the complete preparation of the drink. A first detail 36 is moreover present and this, for example, can represent the variety of the brewed drink that is recognised by a capsule recognition device (specifically the name of a capsule variety for example). A second detail 37, for example, represents the drink that is selected by the user via the operating element and/or via the separate operating appliance, thus for example "milk coffee" "latte macchiato", a user-defined and accordingly specifically named recipe (preparation prescript), etc.

Supplementarily or alternatively, instructions to the user can also be displayed, for example—depending on the selected recipe—"please now add caramel syrup" or "supplement with ice cubes" or also maintenance instructions such as "please refill the milk container with milk".

Figure 3:
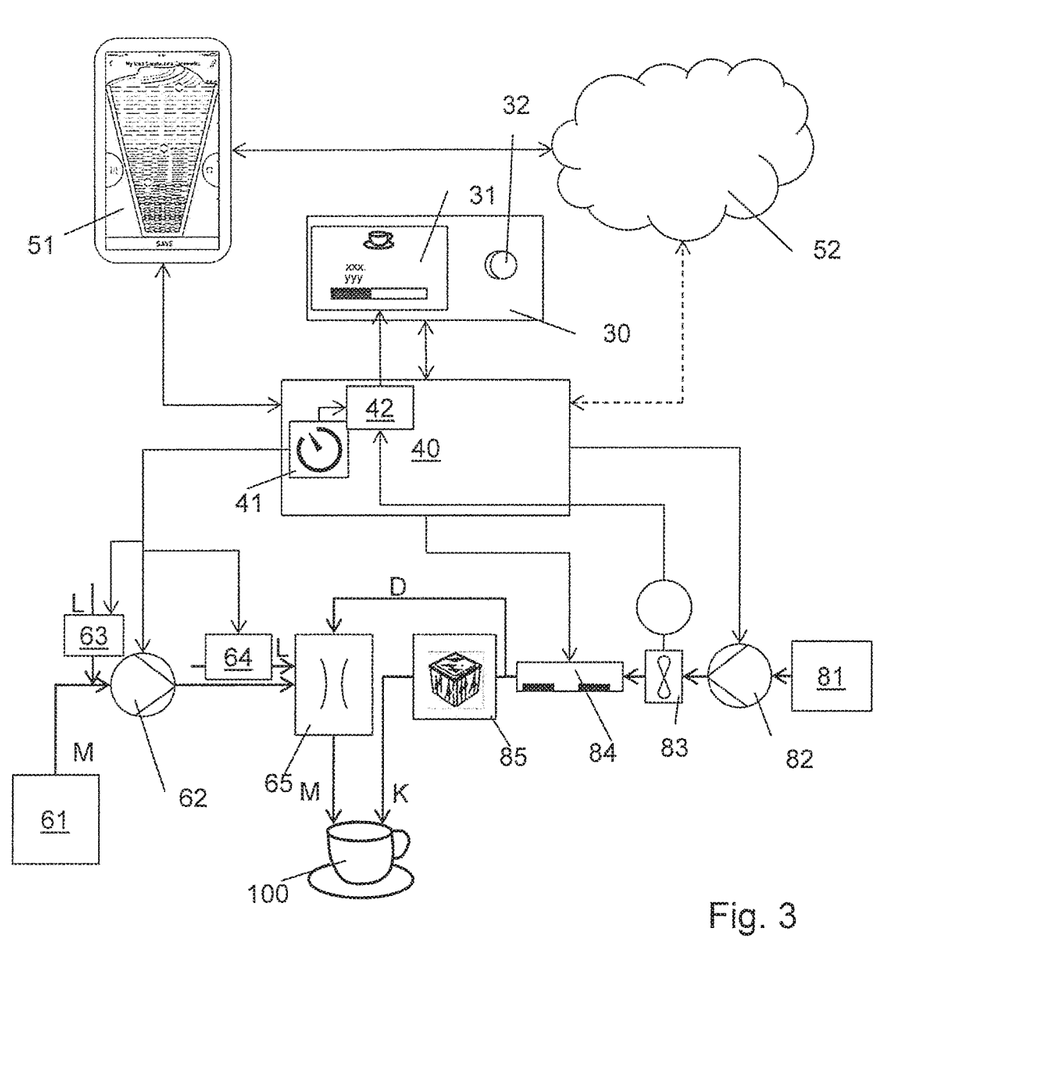
FIG. 3 shows a schematic diagram of a drinks preparation system with the drinks preparation machine and an operating appliance.

FIG. 3 shows a schematic diagram of the drinks preparation system that, apart from the drinks preparation machine that is described by way of FIG. 1, also includes an optional operating appliance 51.

The operating appliance can be connected to a network 52, for example the internet or intranet, and it is also possible for a direct connection to additionally exist between such a network 52 and the drinks preparation machine.

The drinks preparation machine includes a central control unit 40 (superordinate to possible controls of the elements of the base unit and of the milk module or containing these controls). The control unit 40 is also configured for a communication connection with the user interface 30 and possibly with the operating appliance 51 and is provided with or connected to corresponding communication means. In particular, the optional operating appliance 51 can communicate with the control unit 40 in a wireless manner (for example, by way of Wi-Fi, Bluetooth, etc.) or if need be in a manner connected by wire (for example, by way of Ethernet, USB).

In this text, the term "control unit" does not necessarily imply that the control unit is a physical unit. In contrast, under certain circumstances it can physically include separate sub-units.

An operating appliance 51 of the described type can be designed as a smartphone and be configured and provided with software, in order to assume the functions that are described in the European patent application 15 194 735.5, which is explicitly referred to here. It includes a user interface, for example a touch-sensitive screen (touchscreen) that functions as an input and output unit. Additionally or alternatively, buttons of the operating appliance can also serve as input units. A voice input can be realised additionally or alternatively to this.

If an operating appliance 51 is present, then information can be outputted to the user and inputs of the user can be inputted, via the user interface 30 and/or the operating appliance 51.

The control unit 40 comprises a memory, in which, amongst other things, preparation prescripts can be stored. A preparation prescript includes control information that can be converted into commands for the control of the base unit 10 and of the supplementary unit 11. Such control information on the one hand comprises sequence information that specifies a sequence of steps that are to be carried out by the base unit 10 and/or the milk module 11 for producing a total product. On the other hand, the control information includes, for example, temperatures, volume details, time details, etc.—hereinafter generally also called preparation parameters—which parameterise a sequence.

Sequence information represents, for example, "switch on the water heating means; switch on the pump of the brewing module for fifteen seconds; wait for at least five seconds after switching off the pump until the water heating means is at temperature desired for steam generation; switch on the milk pump for twelve seconds and simultaneously open the steam valve". The times and temperatures mentioned in this example can be specified by preparation parameters and/or be determined by the control in accordance with other preparation parameters and measured values of sensors.

A preparation prescript can also include user instructions. These instructions are part of the preparation of the total product and must be carried out by a user. For this, the user instructions can be displayed via the user interface 44 and/or possibly via the operating appliance 51. For example, such user instructions are "now add ice cubes" or "please measure 20 ml caramel syrup" or "now add the prepared caramel syrup" or "please stir" or "please examine whether the inserted capsule and selected recipe match" etc. A user instruction can be accompanied by a visual representation, for example of the total product to be created, of a selected or actually inserted capsule etc.

For preparing a product, control information or corresponding commands are implemented by the base unit 10 and the supplementary unit 11 in accordance with the preparation prescript and a preparation sequence is realised by this. If the preparation prescript includes user instructions, then these are displayed to the user at corresponding locations of the sequence. For example, after an acknowledgement by the user by way of the operating unit 32 or possibly via the operating appliance, the subsequent control information of the preparation sequence is implemented.

A preparation prescript can include preparation parameters that may be adapted by the user, as well as preparation parameters that cannot be adapted by the user. Adaptable preparation parameters, for example, are (volume) shares of drinks constituents in the total product, a total quantity, or the temperature of a drinks constituent. For adaptable preparation parameters, the preparation prescript can include a standard value or default value that is used if the user does not adapt the parameter.

A selection of one or more such preparation parameters is displayed to the user via the user interface 30 or possibly via the operating unit 51 and an input of the user for adapting the preparation parameter is detected, for adapting adaptable preparations parameters. The input can be effected by way of actuating real buttons and/or virtual buttons such as keys or "buttons" in particular "arrow keys" and/or displaceable markings or "sliders" on a touchscreen of the operating appliance 51.

In FIG. 3, the path of the brewing fluid into a drinks vessel 100, which is placed on the placement platform, is represented from the very right to the left, and the path of the milk into the same drinks vessel is shown from the very left to the right.

As the brewing liquid, water is delivered by a water pump 82 from a water tank 81 to a water heating means 84—continuous heater or boiler —, where it is heated to a brewing temperature, for example to a temperature of between 90° C. and the boiling point, for preparing the brewed drink. A flowmeter 83 (here illustrated as a turbine wheel flowmeter), which measures the flow of the liquid that is delivered by the pump, is arranged on the path to the water heating means, i.e. between the water tank 81 and the pump 82 or, as drawn, between the pump 82 and the water heating means 84. The water gets from the water heating means into the brewing module 85 where it is delivered here through a capsule, which is filled with ground coffee powder, for the extraction process. The brewing fluid is then delivered as coffee K via the coffee outlet and gets into a drinks vessel 100, which is placed below the outlet. The heated water can selectively also be vapourised and be fed to the milk module as steam D, or be fed to the milk module, for example as a cleaning fluid (the latter alternative is not illustrated in FIG. 3).

The milk M is delivered out of a milk vessel 61, in particular by a milk pump 62, which is designed, for example, as a gear pump as is described in PCT/EP2015/071795. Depending on the desired preparation type, the milk can be frothed in a cold manner by way of this pump, amid the feed of air L (first air valve 63). The milk gets from the milk pump 62—under certain circumstances at least partly as milk froth—into a mixing nozzle 65, where, depending on the desired preparation type, it is heated amid the feed of steam D and/or is frothed amid the feed of air (second air valve 64). It then gets from there through the milk outlet into the drinks vessel 100.

The first as well as the second air valve 63, 64 can be activated, for example. The temperature as well as the froth share with can be controlled within limits by way of the selection of the air feed via the first air valve 63 and/or the second air valve and/or the feed of steam. With regard to this, functioning principles of a possible milk module are described in the mentioned PCT/EP2015/071795, which is explicitly referred to inasmuch as this concerned.

The control unit 40 activates the water pump 82, the milk pump 62 and the valves 63, 64 and also controls the flow of the heated water or steam (into the brewing module 85, the mixing nozzle, possibly a path for cleaning fluid), for example via an activatable multi-way valve (not represented in FIG. 3). The control unit 40 is also in communication connection with the user interface 30. For determining the filling level, which is outputted via the display element 34, on the one hand the result of the measurement by the flowmeter 83 is take into account and, on the other hand, the time during which milk is delivered, under certain circumstances depending on the opening condition of the air valves 63, 64 (i.e. depending on whether one froths or not and possibly under certain circumstances also on how large the froth share is) and/or on a steam feed into the mixing nozzle. This is represented in FIG. 3 by a timer 41, which detects the time for the milk preparation and transfers it further to a device for determining the fluid level 42, the device being located in the control unit 40 and to which the results of the flow measurement are also led.

Figure 4A:
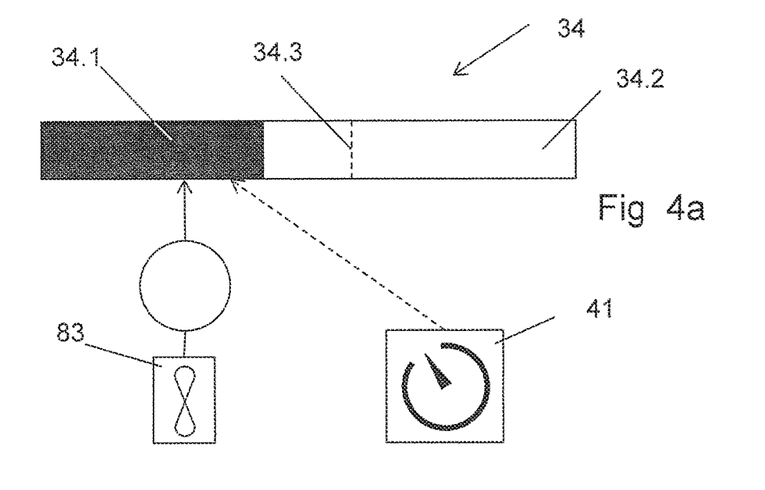
FIGS. 4a, 4b show the progress bar of the display device at different points in time during the drinks preparation.
Figure 4B:
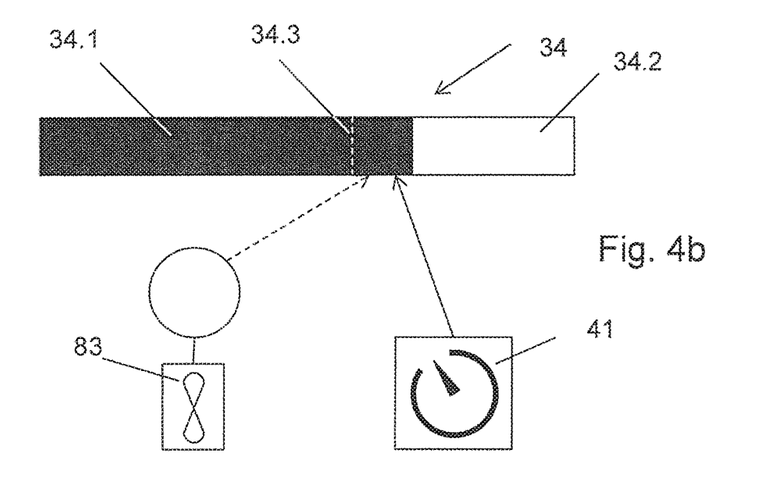

FIGS. 4*a* and 4*b* show the display element 34 (the progress bar) during different phases of the drinks preparation. In a first phase (FIG. 4*a*), the one (first) drinks constituent is prepared and the respective progress is represented by way of the growing filled-out bar part 34.1. The first drinks constituent, for example, can be the brewed drink, whose filling level is determined by the flowmeter 83 (unbroken arrow). Conversely, the milk constituent can be prepared first of all, depending on the recipe, in which case the filled-out bar part grows during the first phase for example as a function of time (dashed arrow). In the second phase (FIG. 4*b*), the second, other drinks constituent or component is prepared, wherein to the user, the filled-out bar part 34.1 simply grows at the expense of the non-filled bar part 34.2. The at least partly simultaneous preparation of the drinks constituents is also not to be ruled out and is then taken into account by way of a corresponding more quickly growing bar.

The display element can optionally also include details on which part represents the first drinks constituent and on which part represents the second drinks constituent, here in the form of a separating line 34.3.

Independently of whether such a detail is present or not, the relative share of the drinks constituents with regard to the complete display element (here the progress bar) can be set in a fixed manner or be dependent on the recipe. In the latter case, for example, it can reflect the relative volume shares, wherein the different densities of milk and milk froth can be taken into account or not.

It the user wishes to adapt the drinks quantity or the quantity of one of the drinks constituents during the preparation process, he actuates, for example, the operating element 32—e.g. by way of rotating the rotary push button—or makes a corresponding input in another manner. The display according to FIG. 4*a*/FIG. 4*b* on the display device is then replaced by another display, for example corresponding to FIG. 5*a* or 5*b*.

Figure 5A:
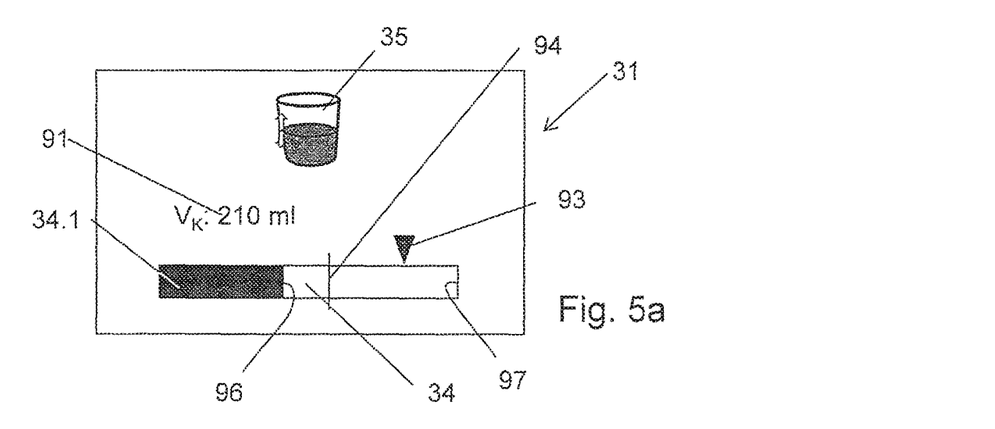
FIGS. 5a, 5b show the display device during a later adaptation of the brewed drink quantity or milk quantity.

FIG. 5*a* shows the adaptation of the brewed drink quantity (coffee quantity), to which the user is led if he actuates the operating element during the preparation of the brewed drink, here in particular by way of rotating the rotary push button (the same or optionally another step, for example an interruption of the preparation procedure and/or the display of a menu selection can be envisaged given an actuation by way of pressing). Apart from another symbol 35, which is adapted, for example, to the step to be carried out, the display element 34 although appearing in a representation analogous to FIG. 4*a*/FIG. 4*b*, this however is to a different scale. The total length of the progress bar (corresponding to 100%) now no longer corresponds to the total drinks quantity according to the selected preparation prescript, but to the maximally possible preparable brewed drink quantity—for example 350 ml, 300 ml, 280 ml, 250 ml, 200 ml or another value which generally lies between 150 ml and 400 ml and which, for example, is dependent on the machine. The length of the filled-out bar part 34.1 consequently corresponds to the percentage share of the already prepared brewed drink quantity to the maximal possible quantity.

Additionally to the actual display element, two further display objects appear: the adjusting arrow 93 can be displaced to the right or left by way of actuating the operating element (rotating the rotary push button) and corresponds to the currently selected total drinks quantity. An optional marking 94, which represents the first drinks quantity according to the preparation prescript and simultaneously represent the starting point for the adjusting arrow 93, from which starting point this arrow can be moved to the right or to the left, also appears. The current, measured, already prepared drinks quantity serves as a lower limit 96 for the selectable values. The upper limit 97 is the mentioned value for the maximally possible preparable brewed drink quantity, which is defined by the machine.

In the represented embodiment example, the corresponding numeric value 91 for the selected drinks quantity is represented simultaneously with the adjusting arrow 93. Optionally and supplementarily or alternatively to the progress bar, the representation of the symbol 35 can also change on adjusting the value, by way of the shown filling level being (co-)moved.

As soon as the user has reached the desired brewed drink quantity, he then confirms the selection by way of pressing the rotary push button. The remaining quantity corresponds to the difference between the selected quantity and the already prepared quantity.

Figure 5B:
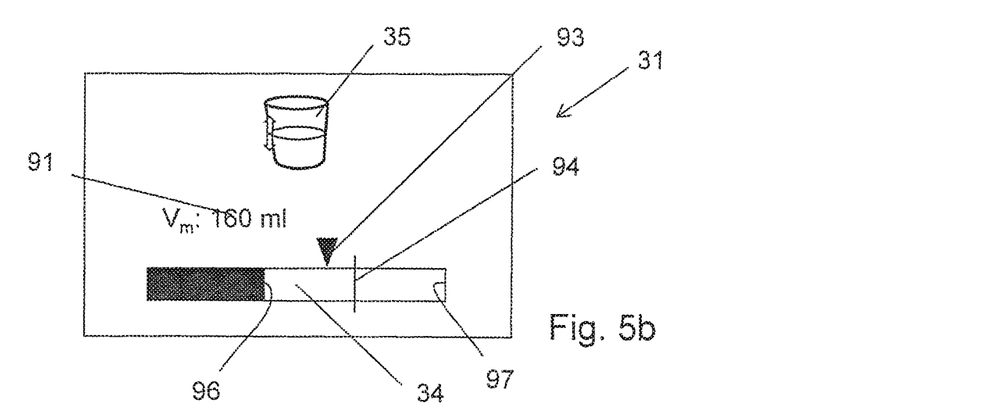

If the rotary push button is actuated during the delivery/preparation of the milk, then as is illustrated in FIG. 5*b*, a display that is quite analogous to the previous one appears, again with the possibility of moving the adjusting arrow 93 between the maximal value 97 and the already prepared/delivered milk quantity as a lower limit 96 and then confirming the made section. In contrast to FIG. 5*a*, an adaptation of the quantity downwards in comparison with the first drinks quantity is represented in FIG. 5*b*. The fact that the milk quantity and not the brewed drink quantity is adapted can be represented, for example, by way of an adapted symbol 35 (here with a lighter colouring of the drink), by way of an adapted inscription of the numerical value 91 and/or by way of further measures (colouring of the progress bar etc.)

LIST OF REFERENCE NUMERALS

1 drinks preparation machine
10 base unit (coffee machine)
11 milk frothing unit
12 docking element
13 milk outlet
14 coffee outlet
16 outlet hood
21 placement platform
22 front
23 milk frothing platform
30 user interface
31 display device
32 operating element
34 display element
34.1 filled-out bar part
34.2 non-filled-out bar part
34.3 separating line
35 symbol
36 first detail
37 second detail
40 control unit
41 timer
42 device for determining the filling level
51 operating appliance
52 network
61 milk vessel
62 milk pump
63 first air valve
64 second air valve
65 mixing nozzle
81 water tank
82 water pump
83 flowmeter
84 water heating means
85 brewing module
91 numerical value
93 adjusting arrow
94 marking for the first drinks quantity
96 lower limit
97 upper limit
100 drinks vessel

The invention claimed is:

1. A drinks preparation system, comprising
a preparation module for a brewed drink;
a milk module for delivery of milk;
an outlet for delivery of the brewed drink and the milk into a drinks vessel placed below the outlet; and
a display device;
wherein the drinks preparation system is configured to determine, during operation, a cumulative quantity of the delivered brewed drink and the delivered milk in real time, and the display device is configured to graphically display the cumulative quantity of the delivered brewed drink and the delivered milk in real time via a common, graphic display element.

2. The drinks preparation system according to claim 1, comprising a first means for determining the quantity of the delivered brewed drink and a second means for determining the quantity of the delivered milk.

3. The drinks preparation system according to claim 2, wherein the first and the second means are different from one another.

4. The drinks preparation system according to claim 2, wherein the first means comprise a flowmeter.

5. The drinks preparation system according to claim 2, wherein the second means is configured to determine a quantity of delivered milk from time elapsed since a beginning of the milk delivery based upon a relationship that is stored in a memory.

6. The drinks preparation system according to claim 1, wherein the milk module comprises a milk frother appliance, and wherein the cumulative quantity comprises a volume of the milk including a milk froth.

7. The drinks preparation system according to claim 1, which is configured to proportionally determine relative volume shares of the brewed drink and of the milk and to display the relative volume shares of the brewed drink and of the milk when displaying the total quantity.

8. The drinks preparation system according to claim 1, wherein the preparation module for the brewed drink comprises a brewing module for receiving a portion package, which is filled with coffee powder.

9. The drinks preparation system according to claim 1, comprising a control unit, which is configured for activating the preparation module and the milk module.

10. The drinks preparation system according to claim 9, comprising an operating appliance with an operating appliance user interface, wherein the operating appliance is configured to transmit preparation prescripts, which are defined and/or selected via the operating appliance user interface, to the control unit.

11. The drinks preparation system according to claim 10, wherein the display device is formed by the operating appliance user interface.

12. The drinks preparation system according to claim 1, further comprising a drinks preparation machine which comprises at least the preparation module, wherein the display device is provided by the drinks preparation machine.

* * * * *